United States Patent
Ohnishi

(10) Patent No.: US 11,441,896 B2
(45) Date of Patent: Sep. 13, 2022

(54) INTER-REFLECTION DETECTION APPARATUS AND INTER-REFLECTION DETECTION METHOD

(71) Applicant: OMRON Corporation, Kyoto (JP)

(72) Inventor: Yasuhiro Ohnishi, Kyotanabe (JP)

(73) Assignee: OMRON CORPORATION, Kyoto (JP)

( * ) Notice: Subject to any disclaimer, the term of this patent is extended or adjusted under 35 U.S.C. 154(b) by 27 days.

(21) Appl. No.: 16/483,461

(22) PCT Filed: Nov. 28, 2017

(86) PCT No.: PCT/JP2017/042601
§ 371 (c)(1),
(2) Date: Aug. 5, 2019

(87) PCT Pub. No.: WO2018/163537
PCT Pub. Date: Sep. 13, 2018

(65) Prior Publication Data
US 2020/0033119 A1    Jan. 30, 2020

(30) Foreign Application Priority Data

Mar. 8, 2017 (JP) .............................. JP2017-043668

(51) Int. Cl.
*G06T 7/521* (2017.01)
*G01B 11/25* (2006.01)

(52) U.S. Cl.
CPC .......... *G01B 11/2527* (2013.01); *G06T 7/521* (2017.01)

(58) Field of Classification Search
CPC ..................................................... G06T 7/521
See application file for complete search history.

(56) References Cited

U.S. PATENT DOCUMENTS 4,343,294 A    8/1982 Daniel
5,343,294 A *  8/1994 Kuchel .............. G01B 11/2531
                                                250/237 G
(Continued)

FOREIGN PATENT DOCUMENTS

CN    105066906 A    11/2015
CN    108534715 A     9/2018
(Continued)

OTHER PUBLICATIONS

English translation of the International Search Report ("ISR") of PCT/JP2017/042601 dated Feb. 6, 2018.
(Continued)

*Primary Examiner* — Brian T Pendleton
*Assistant Examiner* — Frank Johnson
(74) *Attorney, Agent, or Firm* — Metroplex IP Law Group, PLLC

(57) ABSTRACT

Provided is an inter-reflection detection apparatus including: an irradiation unit configured to emit light having variable-frequency sinusoidal patterns; an image acquisition unit configured to acquire an image of an object irradiated with the light from the irradiation unit; a phase determination unit configured to determine a phase at each position in the image; and a detection unit configured to detect a region in which inter-reflection occurs. The detection unit is configured to determine a phase difference between a phase acquired from an image generated by irradiation of a low-frequency sinusoidal pattern and a phase acquired from an image generated by irradiation of a high-frequency sinusoidal pattern for a plurality of combinations of low-frequency waves and high-frequency waves, and determine that inter-reflection occurs in a region in which the phase difference for any one of the plurality of combinations is equal or more than a threshold.

6 Claims, 6 Drawing Sheets

(56) References Cited

U.S. PATENT DOCUMENTS

| | | | |
|---|---|---|---|
| 9,797,854 B1* | 10/2017 | Silva | G01B 7/06 |
| 2003/0016366 A1* | 1/2003 | Takeda | G01B 11/2513 |
| | | | 356/604 |
| 2006/0052699 A1* | 3/2006 | Angelsen | A61B 8/483 |
| | | | 600/437 |
| 2011/0222755 A1* | 9/2011 | Kimura | G06T 7/521 |
| | | | 382/141 |
| 2012/0176478 A1 | 7/2012 | Wang et al. | |
| 2012/0237112 A1* | 9/2012 | Veeraraghavan | G06T 7/521 |
| | | | 382/154 |
| 2014/0078490 A1 | 3/2014 | Higo et al. | |
| 2014/0307085 A1* | 10/2014 | Ohsawa | G01B 11/026 |
| | | | 348/136 |
| 2015/0062558 A1* | 3/2015 | Koppal | G01S 17/46 |
| | | | 356/5.01 |
| 2015/0204662 A1* | 7/2015 | Kobayashi | G01B 11/25 |
| | | | 356/610 |
| 2015/0229907 A1 | 8/2015 | Bridges et al. | |
| 2015/0330775 A1 | 11/2015 | Basevi et al. | |
| 2015/0362312 A1* | 12/2015 | Higo | G06T 7/586 |
| | | | 356/610 |
| 2017/0241767 A1* | 8/2017 | Miyata | G06K 9/4604 |
| 2017/0365065 A1* | 12/2017 | Stigwall | G06T 7/11 |
| 2020/0386540 A1* | 12/2020 | Hseih | G01B 11/2513 |

FOREIGN PATENT DOCUMENTS

| | | |
|---|---|---|
| JP | 2008-309551 A | 12/2008 |
| JP | 2009-019941 A | 1/2009 |
| JP | 2014-059261 A | 4/2014 |
| JP | 2015-132509 A | 7/2015 |
| WO | 2012/096747 A1 | 7/2012 |

OTHER PUBLICATIONS

English translation of the Written Opinion("WO") of PCT/JP2017/042601 dated Feb. 6, 2018.

Chinese Office Action dated Sep. 23, 2020 for the corresponding Chinese Patent Application No. CN201780085360.8, with English translation.

Wang Xianghua et al., "Laser technology", Aug. 2007, No. 4 of vol. 31; Relevance is indicated in the (translated) CNOA dated Sep. 23, 2020.

Extended European Search Report dated Dec. 15, 2020 for the corresponding EP17899370.5.

Erik Lilienblum et al. "Optical 3D Surface Reconstruction by a Multi-period Phase Shift Method", Journal of Computers, Apr. 1, 2007, pp. 73-83; Relevance is indicated in the Extended European Search Report dated Dec. 15, 2020.

Sergio Fernandez et al. "Absolute phase mapping for one-shot dense pattern projection", Computer Vision and Pattern Recognition Workshops (CVPRW), 2010 IEEE Computer Society Conference on, IEEE, Piscataway, NJ, USA, Jun. 13, 2010, pp. 64-71; Relevance is indicated in the Extended European Search Report dated Dec. 15, 2020.

Sergio Fernandez et al. "Handbook of 3D machine vision: optical metrology and imaging, Chapter 5: Basic Concepts", Jan. 1, 2013, Handbook of 3D Machine Vision : Optical Metrology and Imaging, Taylor & Francis, Boca Raton, pp. 101-149; Relevance is indicated in the Extended European Search Report dated Dec. 15, 2020.

Shree K Nayar et al. "Fast separation of direct and global components of a scene using high frequency illumination", International Conference on Computer Graphics and Interactive Techniques, ACM SIGGRAPH 2006 Papers, Boston, Massachusetts, ACM, New York, NY, USA, Jul. 1, 2006, pp. 935-944; Relevance is indicated in the Extended European Search Report dated Dec. 15, 2020.

Tongbo Chen et al. "Modulated phase-shifting for 3D scanning", 2008 IEEE Conference on Computer Vision and Pattern Recognition, Jun. 1, 2008, pp. 1-8; Relevance is indicated in the Extended European Search Report dated Dec. 15, 2020.

Mohit Gupta et al. "A Practical Approach to 3D Scanning in the Presence of Interreflections, Subsurface Scattering and Defocus", International Journal of Computer Vision, vol. 102, No. 1-3, Mar. 1, 2013, pp. 33-55; Relevance is indicated in the Extended European Search Report dated Dec. 15, 2020.

Moreno Daniel et al. "Embedded phase shifting: Robust phase shifting with embedded signals", 2015 IEEE Conference on Computer Vision and Pattern Recognition (CVPR), IEEE, Jun. 7, 2015, pp. 2301-2309; Relevance is indicated in the Extended European Search Report dated Dec. 15, 2020.

Chinese Office Action dated Apr. 30, 2021 for the counterpart Chinese Patent Application, with English translation.

\* cited by examiner

PROJECTED LIGHT PATTERN (SINUSOIDAL PATTERN)

PHASE ESTIMATION BASED ON PHASE SHIFT METHOD $$I_k = I_0 + I\cos(\theta + \varphi_k)$$

INTER-REFLECTION DETECTION APPARATUS AND INTER-REFLECTION DETECTION METHOD

TECHNICAL FIELD

The present invention relates to a three-dimensional measurement technique to measure a three-dimensional position from a captured image of a measurement object, and more particularly, to a technique to detect the generation of inter-reflection (multiple reflection).

BACKGROUND ART

An active stereo measurement is known as a method of measuring a three-dimensional shape of a measurement object. In the active stereo measurement, imaging is performed in a state of projecting a pattern light to a measurement object, and the three-dimensional shape (three-dimensional position of each pixel) of the measurement object is determined by the triangulation based on the position of the pattern on the captured image.

In the active stereo measurement, the light received by a pixel is assumed to be light from only one light source. However, depending on the shape of the measurement object, the light projected to the measurement object reflects a plurality of times on the surface. This phenomena is called inter-reflection or multiple reflection (hereafter called "inter-reflection"). When inter-reflection occurs, lights from a plurality of light source points are received by one pixel, which means that the measurement accuracy drops.

PTL 1 discloses that phases (corresponding to heights) are calculated respectively from images captured by irradiating lights with sinusoidal patterns having different frequencies, and it is determined that inter-reflection occurs if the difference of two phases is large.

CITATION LIST

Patent Literature

[PTL 1] Japanese Patent Application Publication No. 2008-309551

SUMMARY OF INVENTION

Technical Problem

However, as a result of intensive study, the inventor of the present invention discovered that the detection failure of inter-reflection may occur in some regions if the method in PTL 1 is used. In other words, in the case of the method of PTL 1, in some cases the generation of inter-reflection may not be accurately detected.

With the foregoing in view, it is an object of the present invention to provide a technique that allows to accurately detect a region in which inter-reflection occurs, using a three-dimensional measurement apparatus (inter-reflection detection apparatus) which determines a position of a measurement object based on the captured images.

Solution to Problem

An inter-reflection detection apparatus according to the present invention includes:

an irradiation unit configured to emit light having variable-frequency (cycle) sinusoidal patterns;

an image acquisition unit configured to acquire an image of an object irradiated with the light from the irradiation unit;

a phase determination unit configured to determine a phase at each position in the image; and a detection unit configured to detect a region in which inter-reflection occurs, in which the detection unit is configured to determine a phase difference between a phase acquired from an image generated by irradiation of a low-frequency sinusoidal pattern (fringe pattern) (this image is called a low-frequency fringe image) and a phase acquired from an image generated by irradiation of a high-frequency sinusoidal pattern (this image is called a high-frequency fringe image) for a plurality of combinations of low-frequency waves and high-frequency waves, and determine that inter-reflection occurs in a region in which the phase difference for any one of the plurality of combinations is equal to or more than a threshold.

It is preferable that one or both of the phase acquired from the high-frequency fringe image and the phase acquired from the low-frequency fringe image are normalized so that these phases can be directly compared. In concrete terms, a phase connection processing may preferably be performed on the phase acquired from the high-frequency fringe image, with reference to the phase acquired from the low-frequency image.

In the present invention, the phase determined by the phase determination unit indicates a three-dimensional position. Therefore the detection unit may detect inter-reflection based the difference of the three-dimensional positions instead of the difference of the phases.

The difference of the phases acquired from the low-frequency fringe image and the high-frequency fringe image, when inter-reflection occurs, changes cyclically in accordance with the distance from the reflection surface (optical path difference between the primary reflected light and the secondary reflected light). Therefore depending on the distance from the refection surface, the phase difference may become zero even if inter-reflection occurs. This cycle changes in accordance with the cycle of the fringes that is used for the measurement. Hence a phase difference is determined for a plurality of combinations of the low-frequency waves and the high-frequency waves, and it is determined that inter-reflection occurs when any one of these phase differences is equal to or more than the threshold, whereby accurate inter-reflection detection, without detection failure, can be implemented.

In the present invention, it may be preferable that all cycles of the high-frequency sinusoidal patterns in the plurality of combinations are the same, and each of the cycles of the low-frequency sinusoidal patterns in the plurality of combinations is an integral multiple of the cycle of the high-frequency sinusoidal pattern. By making the high-frequency sinusoidal patterns the same, a number of images to be captured can be lowered. Further, by making the cycle of the low-frequency waves an integral multiple of the cycle of the high-frequency waves, the phase connection processing can be used when a three-dimensional position is calculated.

In the present invention, it may be preferable that the plurality of combinations of the low-frequency waves and the high-frequency waves are set such that the phase difference of any one of the combinations becomes equal to or more than the threshold when inter-reflection to be detected occurs. For example, the cycles of the low-frequency sinusoidal patterns in the plurality of combinations may be different from each other, and are a multiple integer, particularly a prime number-multiple of a shortest (smallest) cycle. Then in a region (position) where the phase difference based on the shortest cycle is zero, the phase difference based on another cycle becomes the maximum. This means that the generation of inter-reflection can be detected with certainty.

The present invention may be regarded as a three-dimensional measurement apparatus or an inter-reflection detection apparatus that includes at least a part of the above mentioned units. The present invention may also be regarded as an inter-reflection detection method that includes at least a part of the processing performed by the above mentioned units. Further, the present invention may be regarded as a computer program that causes a computer to execute each step of this method, or a non-transitory computer readable storage medium that stores this program. The present invention may be configured by combining each of the above configurations and processing within a scope that does not cause technical inconsistency.

Advantageous Effects of Invention

According to the present invention, in a three-dimensional measurement apparatus which determines a position of a measurement target object based on captured images, a region in which inter-reflection occurs can be accurately detected.

DESCRIPTION OF EMBODIMENT

Figure 1:
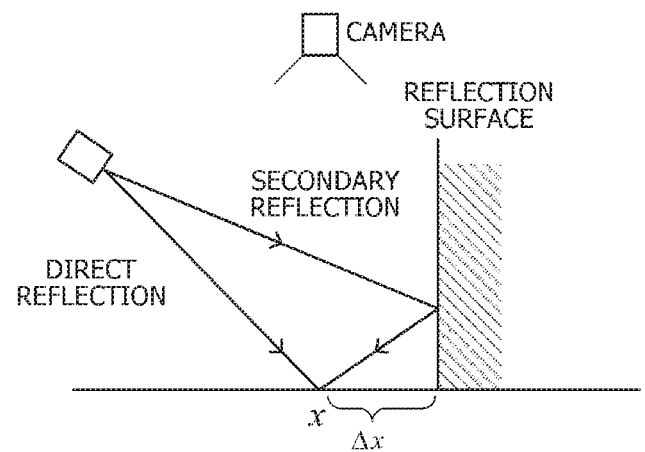
FIG. 1 is a diagram depicting an inter-reflection (multiple reflection).

A preferred embodiment of the present invention will now be described with reference to the drawings. A three-dimensional measurement system according to this embodiment captures images of a measurement object by projecting a high-frequency sinusoidal pattern light and a low-frequency sinusoidal pattern light, and measures a three-dimensional shape of the measured object based on the captured images. Further, the three-dimensional measurement system detects the generation of inter-reflection based on the difference of phases determined by the high-frequency sinusoidal pattern and the low-frequency sinusoidal pattern respectively.

The inventor of the present invention discovered that with the conventional method according to PTL 1, detection failure of inter-reflection occurs and also discovered the cause of this, and based on this information, the inventor derived an inter-reflection detection method that does not cause detection failure. Now in order to describe the cause of this detection failure of inter-reflection in the case of the conventional method, the principle of the phase shift method will be described first.

<Principle of Phase Shift Method>

The phase shift method is a method of acquiring images by projecting a light, with a sinusoidal fringe pattern having a certain frequency (cycle), to an object for a plurality of times with shifting the phase, then estimating the phases from the plurality of acquired images and restoring a three-dimensional shape based on the estimated phases. To estimate a phase, at least three sinusoidal patterns, of which phases are shifted, are required. If a number of sinusoidal patterns is four, the brightness value In (x,y) of each pixel is given by the following expression (n=0, 1, 2, 3).

$$I_n(x, y) = A(x, y) \cos\left(\phi(x, y) + \frac{n\pi}{2}\right) + C(x, y) \quad \text{[Math. 1]}$$

Here $\phi$ denotes a phase to be estimated, A denotes an amplitude, and C denotes an offset.

The phase $\phi$ of each pixel can be estimated by the following expression using four brightness values.

$$\phi(x, y) = \tan^{-1}\left(\frac{I_3(x, y) - I_1(x, y)}{I_0(x, y) - I_2(x, y)}\right). \quad \text{[Math. 2]}$$

In the phase shift method, a high-frequency fringe pattern for measurement and a low-frequency fringe pattern for reference may be used. If the high-frequency fringe pattern is used, the resolution of the measurement can be improved, but the detectable distance range decreases. Therefore referring to the phase of the low-frequency fringes, the phase of the high-frequency fringes is converted into a continuous variable in a wide range. This orientation is called "phase connection". The phase of the high-frequency fringes and the phase of the low-frequency fringes are both determined by the above method.

It is assumed that the wavelength of the high-frequency fringes to be measured is $\lambda$, the phase thereof is $\phi s$, the wavelength of the low-frequency fringes to be used for phase connection is $\alpha\lambda$, and the phase thereof is $\phi_1$. In this case, the phase $\phi$ after performing the phase connection for the phase $\phi s$, referring to the phase $\phi_1$, can be acquired by the following expression.

$$\phi(x, y) = \frac{\phi_s(x, y)}{\alpha} + \left(\phi_l(x, y) - \phi_l(x, y) \bmod \frac{2\pi}{\alpha}\right) \quad \text{[Math. 3]}$$

Here $\alpha$ denotes a connection magnification (2 or greater integer), and k is an integer between 0 and $\alpha-1$ inclusive.

The phase $\phi$ can be converted into the height h by the following expression, for example, using a reference phase $\phi_0$, which is determined for each pixel in advance based on the connected phase $\phi$ and the calibration, and a polynomial $f(\phi)$.

$$h(x,y)=f(\phi(x,y)-\phi_0(x,y))\qquad\text{[Math. 4]}$$

<Reason why Detection Failure Occurs in Prior Art>

It is assumed that an angular frequency of the fringes that appears in the captured image is $\omega$, and the cycle thereof is $\lambda$. When the direct reflection and the secondary reflection exist, as illustrated in FIG. 1, an observed brightness value I can be given by the following expression, using the position x and the distance $\Delta x$ from the reflection surface.

$$I(x,\omega) = A\cos\omega x + B\cos\omega(x+2\Delta x) = C\cos(\omega x + \tau(\omega,\Delta x))\qquad\text{[Math. 5]}$$

Here, the following expressions are satisfied.

$$C^2 = A^2 + B^2 + 2AB\cos 2\omega\Delta x \qquad\text{[Math. 6]}$$
$$\tau(\omega,\Delta x) = \tan^{-1}\frac{B\sin 2\omega\Delta x}{A+B\cos 2\omega\Delta x}$$

The phase $\phi$ estimated at this time is given by the following expression.

$$\phi=\omega x+\tau\qquad\text{[Math. 7]}$$

Figure 2:
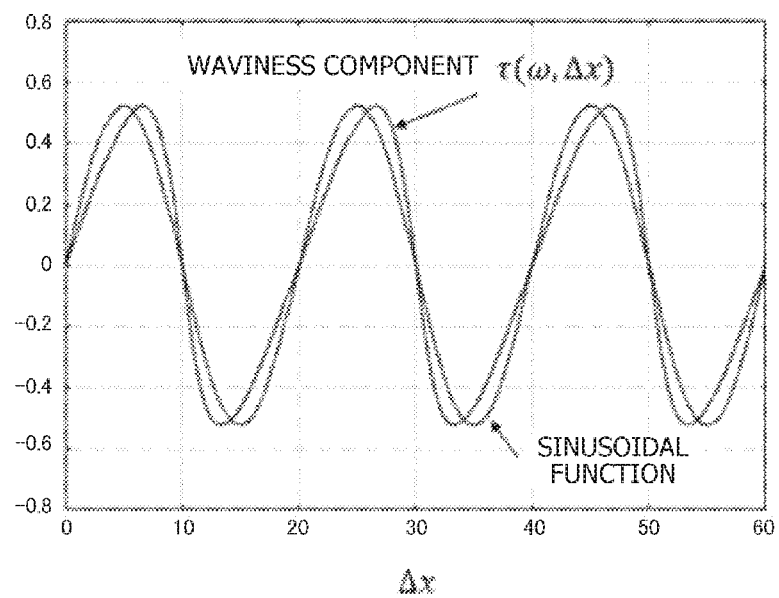
FIG. 2 is a graph depicting a state where a waviness component is superimposed on the detected phase when inter-reflection occurs.

In other words, in the case where the secondary reflection exists, the waviness component r is added to the estimated phase $\phi$, in addition to the true value phase $\omega x$. FIG. 2 indicates an example of the waviness component $\tau$. In the waviness component $\tau$, the sinusoidal function A' sin $(2\omega\Delta x)$ has a deformed shape, and becomes 0 when the distance $\Delta x$ from the reflection surface is a multiple of $\lambda/4$.

In the prior art, it is determined that inter-reflection occurs when the phases acquired from the low-frequency fringes and the high-frequency fringes are equal to or more than a threshold. Here it is assumed that the high-frequency fringes have a cycle $\lambda$ and an angular frequency $\omega_1$, and the low-frequency fringes have a cycle $\alpha\lambda$ and angular frequency $\omega_2$ $(=\omega_1/\alpha)$. $\alpha$ here is a 2 or greater integer. $\phi_2$ is an estimated phase of the low-frequency fringes, and $\phi_1$ is a phase after performing the phase connection for the estimated phase of the high-frequency fringes using the estimated phase $\phi_2$ of the low-frequency fringes. If inter-reflection occurs, $\phi_1$ and $\phi_2$ include a waviness component respectively, and can be expressed as follows. In phase $\phi_1$, $\omega_1 x+\tau_1$ before the phase connection is multiplied by $1/\alpha$ by the phase connection.

$$\phi_1 = \frac{\omega_1}{\alpha}x + \frac{\tau_1(\omega_1,\Delta x)}{\alpha}\qquad\text{[Math. 8]}$$
$$\phi_2 = \omega_2 x + \tau_2(\omega_2,\Delta x)$$

Since $\omega_1/\alpha=\omega_2$, the phase difference D $(\Delta x)=\phi_2-\phi_1$ is given by the difference of the waviness components as follows.

$$D(\Delta x) = \phi_2 - \phi_1\qquad\text{[Math. 9]}$$
$$= \tau_2(\omega_2,\Delta x) - \frac{\tau_1(\omega_1,\Delta x)}{\alpha}$$

Figure 3:
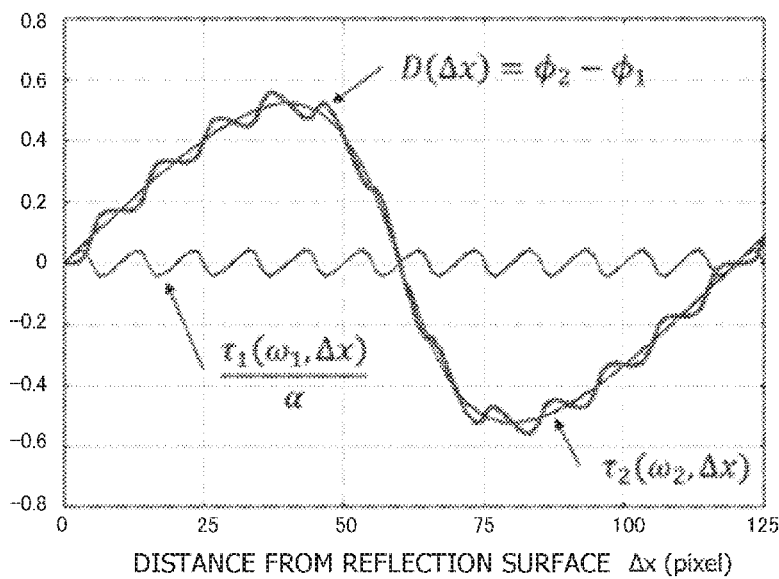
FIG. 3 is a graph depicting phases estimated from the high-frequency fringe image and the low-frequency fringe image respectively, and the phase difference thereof when inter-reflection occurs.

For example, a phase difference D $(\Delta x)=\phi_2-\phi_1$ when the high-frequency fringe cycle $\lambda_1=20$ pixels, and the low-frequency fringe cycle $\lambda_2=240$ pixels is indicated in FIG. 3, along with each waviness component $\tau_1/\alpha$ and $\tau_2$. As indicated in FIG. 3, the phase difference D becomes 0 at every ¼ low-frequency fringe cycle (at every $\lambda_2/4$). Therefore if the distance from the reflection surface of the region, in which inter-reflection occurs, is smaller than $\lambda_2/4$, no problem of detection failure is developed (detection is unnecessary in the vicinity of the reflection surface), but if this distance from the reflection surface is larger than $\lambda_2/4$, detection failure occurs.

<Overview of Inter-Reflection Detection Method of Present Invention>

As mentioned above, the detection failure occurs depending on the relationship between the low-frequency fringe cycle and the high-frequency fringe cycle. Based on this knowledge, the present inventor discovered that a tentative detection is performed by comparing the phase difference and a threshold using a plurality of low-frequency fringes of which cycles are mutually different, and the logical sum of the detection results is determined, whereby detection failure can be avoided.

In the case of using n (n is a 2 or greater integer) number of low-frequency fringe cycles $\lambda_2^{(1)}, \lambda_2^{(2)}, \ldots, \lambda_2^{(n)}$, the cycle of detection failure is ¼ (least common multiple) of each cycle $\lambda_2^{(1)}, \lambda_2^{(2)}, \ldots, \lambda_2^{(n)}$.

Figure 4:
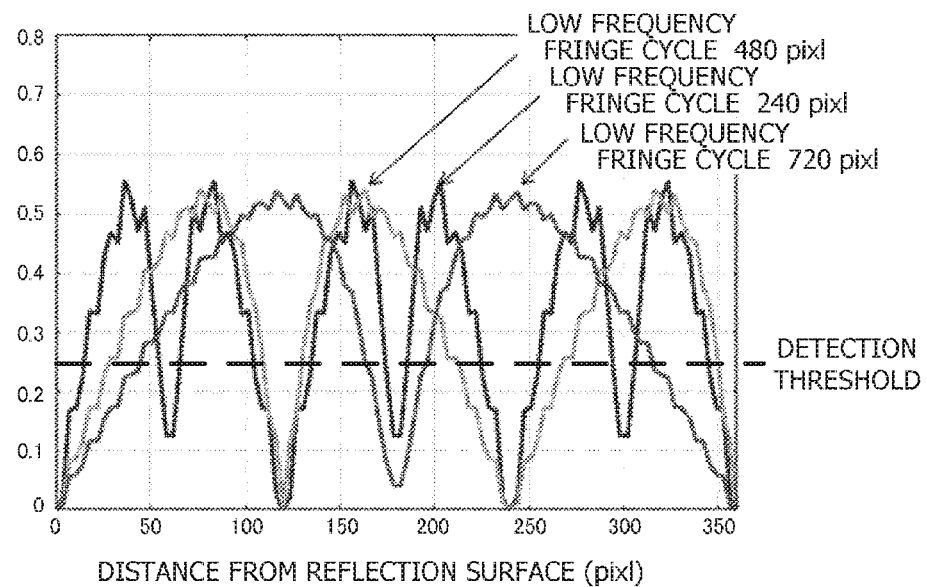
FIG. 4 is a graph depicting phase differences estimated from the high-frequency fringe image and a plurality (three) of low-frequency fringe images when inter-reflection occurs.

FIG. 4 indicates each phase difference between the phase acquired from the high-frequency fringe image and the phase acquired from the low-frequency fringe image in a state where inter-reflection occurs. Here the high-frequency fringe phase is fixed at 20 pixels, and three types of low-frequency fringe cycles (240 pixels, 480 pixels and 720 pixels) are used. Therefore three types of phase differences are determined. FIG. 4 is the result acquired by numerical simulation. The abscissa indicates the distance from the reflection surface, and the ordinate indicates the phase difference.

As depicted in FIG. 4, within a region of 360 pixels from the reflection surface (except the vicinities of 0 pixel and 360 pixels) the phase difference of at least one of the low-frequency fringes becomes at least the detection threshold. Hence detection failure does not occur within 360 pixels from the reflection surface. Thus compared with the case of using only 240 pixel cycles for the low-frequency fringes, the range of detection without failure can be expanded by about 4 times.

A number of types of the low-frequency fringes that are used need not be three, but may be two or four or more. As a number of types of the low-frequency fringes increases, the occurrence of detection failure can be more easily prevented. Further, only the high-frequency fringes of which cycle is 20 pixels is used here, but the cycles of the high-frequency fringes may be changed in accordance with the low-frequency fringes. However, if common high-frequency fringes are used for all the low-frequency fringes, a number of times of image capturing and the calculation volume can be decreased.

A specific frequency may be set such that any one of the phase differences (differences between the phase of the high-frequency fringes and the phase of the low-frequency fringes) is equal to or more than a detection threshold in a range where inter-reflection occurs, which is determined by the intensity of the assumed secondary reflection (to be the detection target). It is preferable to determine a combination of frequencies such that all the positions where the phase difference D becomes zero do not match in the above mentioned range. Here matching the positions where the phase difference becomes zero not only means the perfect matching of positions, but also includes the matching of positions within a predetermined tolerance (e.g. $\frac{1}{20}$, $\frac{1}{10}$ or the like of the cycles of low-frequency waves).

It is also preferable that a plurality of cycles of the low-frequency fringes are integral multiples of a shortest cycle (hereafter called "reference cycle") thereof. It is also preferable to use a prime number multiple of the reference cycle, and it is particularly preferable to use prime number multiples consecutively from 2, such as ×2, ×3, ×5, ×7, . . . . This is because in a region (distance range from the reflection surface) where the phase difference of the low-frequency fringes having the reference cycle becomes 0, the phase difference of other low-frequency fringes becomes the maximum.

The phase difference may be determined for all combinations of the sinusoidal patterns having cycles used for irradiation and imaging. For example, in the case where an object is irradiated with five types of sinusoidal patterns having different cycles and imaged, the phase difference is determined for 10 combinations. Then it may be determined that inter-reflection occurs if any one of the phase differences is equal to or more than the threshold. By this, phase difference can be determined for more combinations with respect to the number of times of imaging.

EXEMPLARY EMBODIMENT

An embodiment of the present invention will now be described with reference to the drawings. The present embodiment is a three-dimensional measurement apparatus to inspect substrates. The three-dimensional measurement apparatus according to this embodiment captures an image of a substrate (measurement object), on which components are installed, by projecting a sinusoidal pattern light, and measures a three-dimensional shape of the measurement object using the triangulation. In this embodiment, the surface height of the substrate (distance from the reference surface which is parallel with the surface on which the substrate is installed) is measured, and whether components are correctly installed on the substrate is inspected.

[Configuration]

Figure 5:
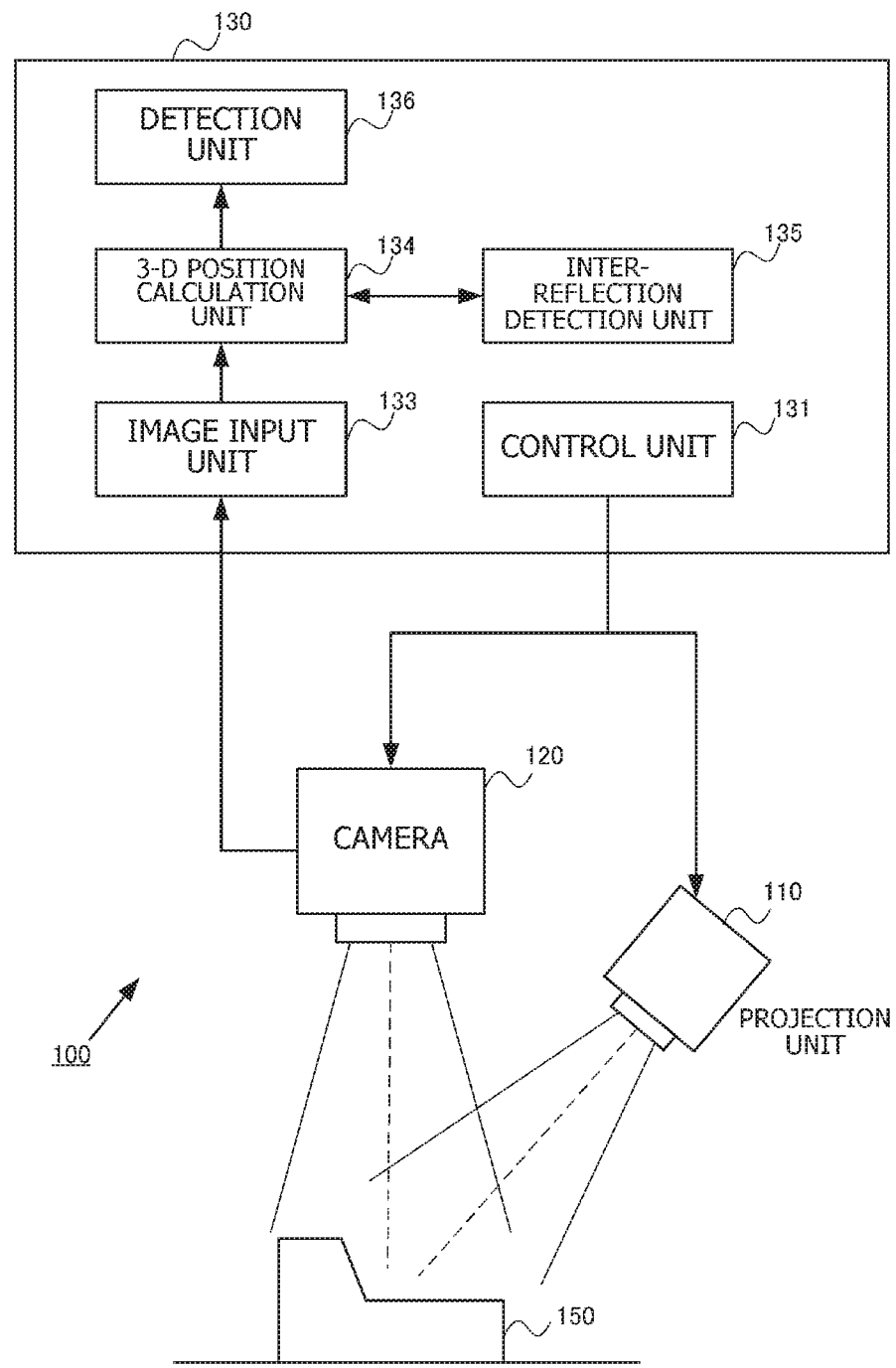
FIG. 5 is a diagram depicting a configuration of a three-dimensional measurement apparatus according to an embodiment.

FIG. 5 is a diagram depicting a configuration of the three-dimensional measurement apparatus 100 according to the present embodiment. The three-dimensional measurement apparatus 100 in outline is constituted of a projection unit 110, a camera 120 and an arithmetic unit 130.

The projection unit 110 projects a sinusoidal pattern light to a measurement object 150. The projection unit 110 includes a light source (e.g. halogen lamp, xenon lamp), pattern generating elements, such as liquid crystal elements, which form a pattern of the light emitted from the light source, and an optical system, such as a micro-lens. The light projected by the projection unit 110 may be an invisible light, such as infrared light, instead of visible light.

Figure 6A:
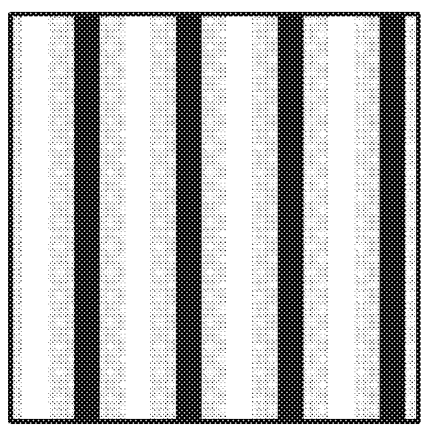
FIG. 6A is a diagram depicting a projected light pattern.

A pattern of the light projected by the projection unit 110 will be described. In this embodiment, the three-dimensional position is measured using the phase shift method, hence the projection unit 110 projects a fringe pattern light which fluctuates cyclically. FIG. 6A is an example of a pattern of the light projected by the projection unit 110. The example in FIG. 6A indicates a pattern light having vertical fringes, that is, a pattern light of which brightness in the horizontal direction sinusoidally changes continuously, and brightness in the vertical direction is constant. The frequency of the sinusoidal wave (spatial frequency of the pattern light) is not especially limited. In this embodiment, the pattern light is projected a plurality of times while shifting the phase of the vertical fringes of the pattern light. To calculate the phase, at least three times of projection are necessary, and the more number of image are captured the better for measurement accuracy. In this embodiment, to simplify the measurement, projection is performed four times with shifting the phase 90° (¼ cycle) at a time. In the following description, the plurality of vertical fringe pattern lights are called a vertical fringe pattern light set. In this way, the three-dimensional position of the measurement object 150 can be measured by calculating the phase of the brightness change generated in the images, using a plurality of images captured by projecting each of the vertical fringe pattern light sets to the measurement object 150 respectively.

Figure 6B:
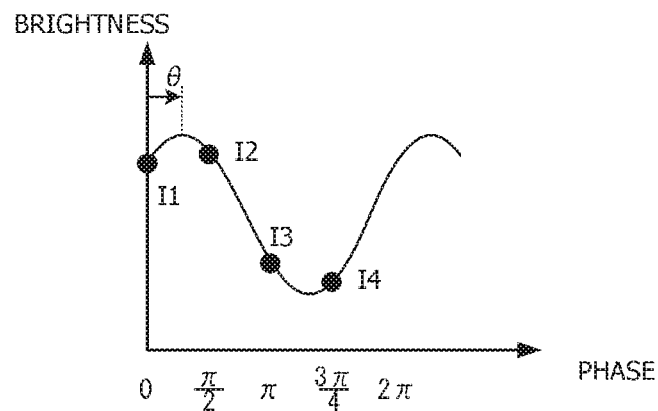
FIG. 6B is a graph depicting a phase estimation method based on a phase shift method.

FIG. 6B is a graph indicating brightness values I1 to I4 at one point in a plurality of (four in this case) images captured with changing the phase of the sinusoidal wave of the projected light. Based on these brightness values, the shift amount θ of the phase at this point can be determined (phase restoration). The three-dimensional position of this point can be determined based on this phase using the triangulation.

The camera 120 images the measurement object 150 to which the pattern light is projected. Based on the instruction from the control unit 131, the camera 120 captures an image each time the projection unit 110 switches the phase of the pattern light. In this embodiment, the image data captured by the camera 120 is inputted to an image input unit 133.

The arithmetic unit 130 is a computer which includes a processor such as a CPU, memory (storage device) such as a RAM and ROM, an interface with an external device, an input device such as a keyboard and a mouse, and an output device such as a display and a speaker. The arithmetic unit 130 provides the functions of a control unit 131, the image input unit 133, a three-dimensional position calculation unit 134, an inter-reflection detection unit 135, an inspection unit 136 and the like by the CPU executing the programs stored in the memory. A part or all of the above functions may be implemented by hardware circuits, such as an application specific integrated circuit (ASIC) and a field programmable gate array (FPGA). Each of these functional units will be described in detail with reference to the following flow chart.

[Processing]

[[General Outline of Substrate Inspection]]

The substrate inspection processing in general, performed by the three-dimensional measurement apparatus 100 according to this embodiment, will be described in brief. The processing described here is merely an example, and the processing contents and the processing sequence thereof may be changed as necessary. Here it is assumed that the calibration of the projection unit 110 and the camera 120 have been completed.

First a sinusoidal pattern is projected from the projection unit 110 to the measurement object 150 with changing the phase at each projection timing, and the camera 120 captures an image of the measurement object 150 at each projection of the pattern light. According to the instruction from the control unit 132, the projection unit 110 projects a sinusoidal pattern light having an instructed phase to the measurement object 150 at an instructed timing. The control unit 132 controls the camera 120 to capture the image each time the projection unit 110 changes the phase of the pattern light. The image data captured by the camera 120 is inputted to the image input unit 133, and is temporarily stored. A plurality of image data captured in step S102 is collectively called "captured image data".

In this embodiment, the above image capturing processing is performed for one high-frequency fringe pattern and a plurality of low-frequency fringe patterns. It is assumed that the cycle of the high-frequency fringe pattern is 20 pixels, and the cycles of the low-frequency fringe patterns are 240, 480 and 720 pixels.

The three-dimensional position calculation unit 134 determines the height of each point (each pixel) included in the distance detection region in the captured images, and determines the average of the heights as the height of this region. When the height is calculated, each phase of the high-frequency fringes and the low-frequency fringes is estimated based on the images, and the phase connection is performed for the estimated phase of the high-frequency fringes using the estimated phase of the low-frequency fringes. The three-dimensional position calculation unit 134 determines the height of each point (three-dimensional position) from the phase after the phase connection.

The inspection unit 136 determines whether the component 52 is correctly installed based on the height in each region. In concrete terms, if the maximum value of the distance difference of each region is within a reference value (allowable variation), and the average of the distance in each region is within a reference value, then the inspection unit 136 determines that the component 52 is correctly installed. It is assumed that these reference values (allowable variation of height and tolerance of height) are set in advance. The conditions to determine whether the component is corrected installed or not are not limited to the conditions described above.

[[Inter-Reflection Detection Processing]]

The inter-reflection detection processing performed by the inter-reflection detection unit 135 will be described with reference to FIG. 7 and FIG. 8. In the following description, the processing performed in the three-dimensional position calculation processing will be described again. In actual inter-reflection detection processing, it is not necessary to execute the same processing again, and the previous processing result may be used.

Figure 7:
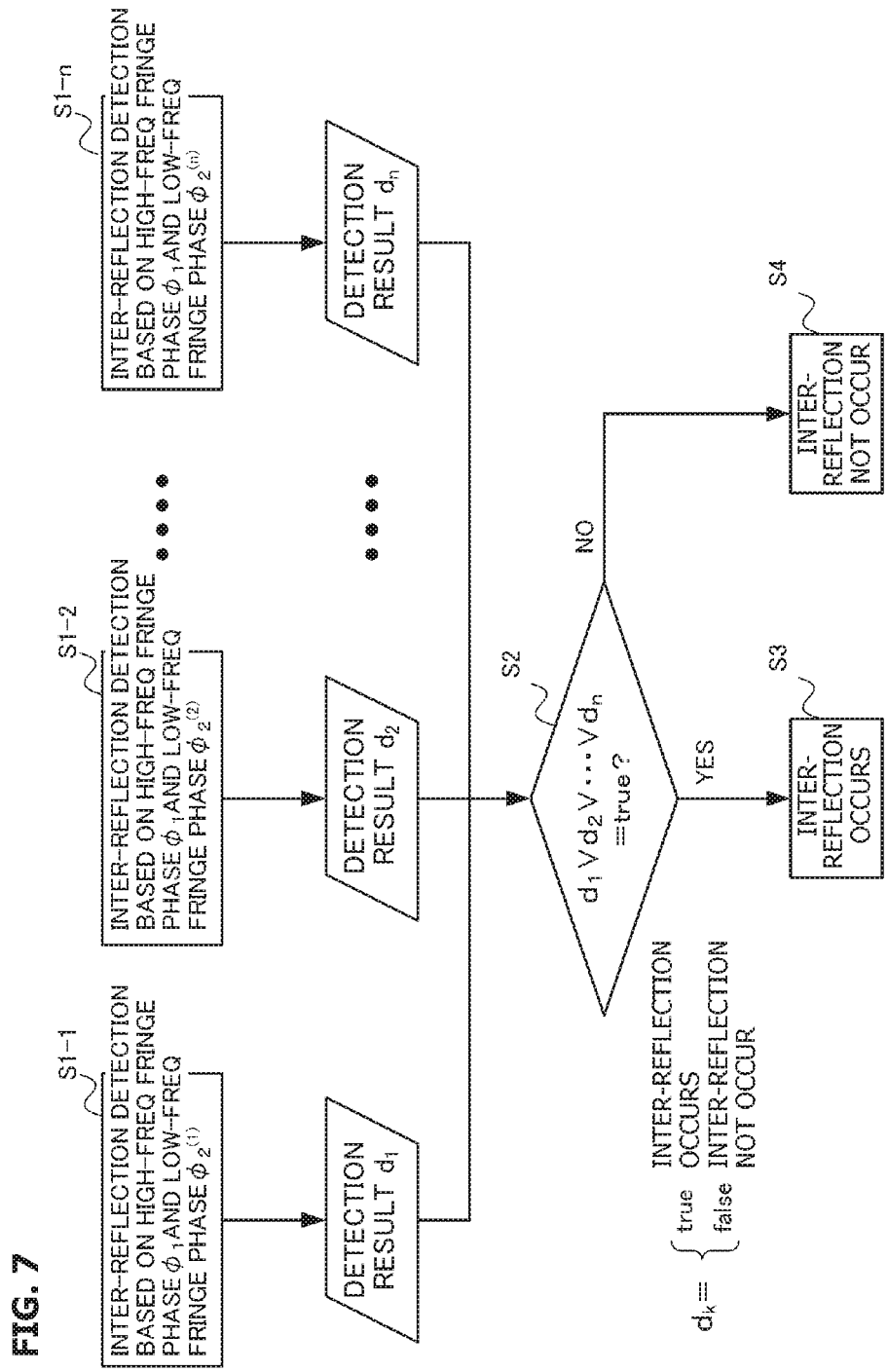
FIG. 7 is a flow chart depicting an inter-reflection detection method.

The processing in FIG. 7 is executed for each point to determine the three-dimensional position. In steps S1-1 to 1-n, inter-reflection is detected based on the phase difference between the phase $\phi_1$ that is estimated from the image generated by projecting the high-frequency fringe pattern (this phase is hereafter called the "high-frequency fringe phase"), and phase $\phi_2^{(k)}$ after the phase connection, which is estimated from an image generated by projecting the k-th (k is an integer in the 1 to n range, n=3 in this embodiment) low-frequency fringe pattern (this phase is hereafter called the "k-th low-frequency fringe phase").

In this embodiment, the high-frequency fringe phase is a phase estimated from an image generated by irradiating a sinusoidal pattern of which cycle is 20 pixels, and the first to third low-frequency fringe phases are the phases (after phase connection) estimated from an image generated by irradiating the sinusoidal patterns of which cycles are 240, 480 and 720, respectively.

Figure 8:
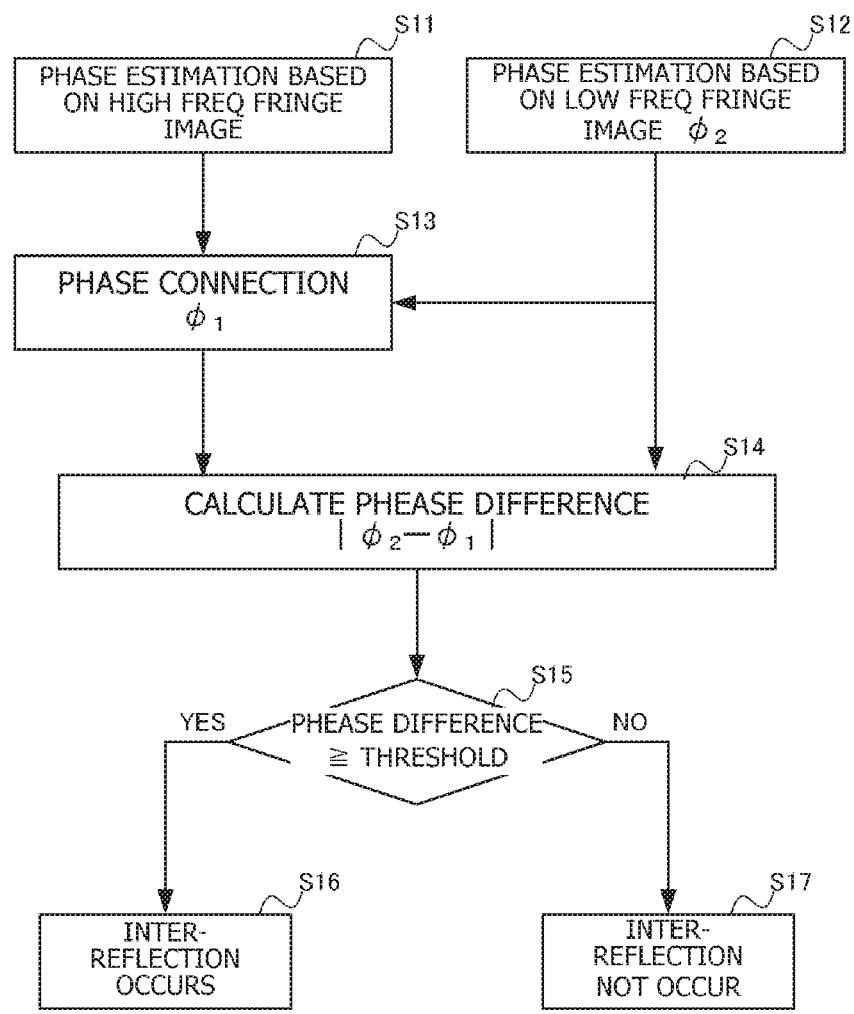
FIG. 8 is a flow chart depicting a method of tentatively determining whether inter-reflection occurs or not based on a set of a high-frequency fringe image and a low-frequency fringe image.

FIG. 8 is a flow art depicting a detailed processing of step S1. In step S11, the phase is estimated from an image generated by projecting the high-frequency fringe pattern (hereafter called the "high-frequency fringe image"). In step S12, the phase $\phi_2$ is estimated from an image generated by projecting the low-frequency fringe pattern (hereafter called the "low-frequency fringe image"). In step S13, the phase connection is performed for the phase determined in step S11 using the low-frequency fringe phase $\phi_2$, whereby the high frequency phase $\phi_1$ is determined.

In step S14, the phase difference (absolute value) between the high-frequency fringe phase $\phi_1$ and the low-frequency fringe phase $\phi_2$ is calculated. If this phase difference is equal to or more than a threshold (YES in S15), it is determined that inter-reflection occurs (S16), and if less than a threshold (NO in S15), it is determined that inter-reflection does not occur. Determination here is a tentative determination based on the high-frequency phase and the k-th low-frequency fringe phase, and is not a final result.

As described above, the inter-reflection detection unit 135 acquires the tentative inter-reflection detection results $d_1$ to $d_n$ for each combination of the high-frequency fringe and the first to n-th low-frequency fringes.

In step S2, the inter-reflection detection unit 135 determines whether any one of the detection results $d_1, d_2, \ldots, d_n$ indicates the generation of inter-reflection. In other words, it is determined whether $d_1+d_2+\ldots+d_n$ is true. Here "+" indicates a logical sum (OR operation), and it is determined that each detection result $d_k$ is true when inter-reflection occurs.

If one of the tentative detection results indicates that inter-reflection occurs (YES in S2), the inter-reflection detection unit 135 determines that inter-reflection occurs (S3), and if not (NO in S2), the inter-reflection detection unit 135 determines that inter-reflection does not occur (S4).

The processing that is performed after the generation of inter-reflection is determined may be arbitrary. For example, when an image indicating the three-dimensional position (height) or the component inspection result is outputted, the region where this inter-reflection occurs may be highlighted in the output. For the region where inter-reflection occurs, the three-dimensional position may be calculated again with changing the image capturing conditions. Examples of changing the image capturing conditions are: changing the position of the light source, changing the illumination intensity, and changing the cycle of the sinusoidal pattern.

According to this embodiment, accurate inter-reflection detection with minimal detection failure can be implemented.

Modifications

The three-dimensional measurement apparatus according to the present invention need not always be included in a substrate inspection apparatus or any other inspection apparatus. Further, the present invention need not always be applied to a three-dimensional measurement apparatus that measures a three-dimensional position of the measurement object, and the invention may be carried out as an inter-reflection detection apparatus which detects only the generation of inter-reflection, without measuring the three-dimensional position.

REFERENCE SIGNS LIST

100 Three-dimensional measurement apparatus
110 Projection unit
120 Camera
130 Arithmetic unit
150 Measurement object
131 Control unit
133 Image input unit
134 Three-dimensional position calculation unit
135 Inter-reflection detection unit
136 Inspection unit

The invention claimed is:
1. An inter-reflection detection apparatus, comprising:
a light source configured to emit light having variable-frequency sinusoidal patterns;

a camera configured to acquire an image of an object irradiated with the light from the irradiation unit; and a processor configured to determine a phase at each position in the image, and detect a region in which inter-reflection occurs, wherein the processor is configured to:

for each of a plurality of combinations of low-frequency sinusoidal patterns and high-frequency sinusoidal patterns, determine a phase difference between:

a first phase acquired by estimation from an image generated by irradiation of the low-frequency sinusoidal pattern; and a second phase acquired by phase connection from: an image generated by irradiation of the high-frequency sinusoidal pattern; and the acquired first phase, the phase connection comprising converting an estimated phase from the image generated by the irradiation of the high frequency sinusoid pattern into a continuous variable; and determine that inter-reflection occurs in a region in which the determined phase difference for any one of the plurality of combinations is equal to or more than a threshold.

2. The inter-reflection detection apparatus according to claim 1, wherein respective cycles of the high-frequency sinusoidal patterns in the plurality of combinations are all the same, and respective cycles of the low-frequency sinusoidal patterns in the plurality of combinations are integral multiples of the cycle of the high-frequency sinusoidal patterns.

3. The inter-reflection detection apparatus according to claim 1, wherein the cycles of the low-frequency sinusoidal patterns in the plurality of combinations are mutually different, and are integral multiples of a shortest cycle.

4. The inter-reflection detection apparatus according to claim 3, wherein the cycles of the low-frequency sinusoidal patterns in the plurality of combinations are prime-number multiples of a shortest cycle.

5. An inter-reflection detection method, comprising:

acquiring images of an object irradiated with light of a plurality of low-frequency sinusoidal patterns and high-frequency sinusoidal patterns for each of a plurality of combinations of low-frequency sinusoidal patterns and high-frequency sinusoidal patterns:

determining a phase difference between:

a first phase acquired by estimation from an image generated by irradiation of the low-frequency sinusoidal pattern; and a second phase acquired by phase connection from:

an image generated by irradiation of the high-frequency sinusoidal pattern; and the acquired first phase, wherein the phase connection comprises converting an estimated phase from the image generated by the irradiation of the high frequency sinusoid pattern, into a continuous variable; and determining that inter-reflection occurs in a region in which the phase difference for any one of the plurality of combinations is equal to or more than a threshold.

6. A non-transitory computer-readable storage medium storing a program that causes a computer to execute each step of the method according to claim 5.

* * * * *